July 14, 1931. J. KOMOROUS 1,814,710

KEY HOLDING DEVICE

Filed Oct. 2, 1929

Inventor:
Joseph Komorous
By Dyrenforth, Lee, Chritton & Wiles
Atty's

Patented July 14, 1931

1,814,710

UNITED STATES PATENT OFFICE

JOSEPH KOMOROUS, OF RIVERSIDE, ILLINOIS, ASSIGNOR TO PARISIAN NOVELTY CO., OF CHICAGO, ILLINOIS, A CORPORATION OF ILLINOIS

KEY-HOLDING DEVICE

Application filed October 2, 1929. Serial No. 396,746.

My invention relates to key-holding devices of the type comprising a flexible element as for example, and preferably, a chain formed of a series of balls connected together, and a coupler to which the ends of the chain element are attached.

One of my objects is to provide for the simple and economical construction of a device of the character above stated.

Another object is to provide a construction whereby the flexible element may be caused to present two loops, preferably of fixed size, for the dual grouping of the keys on the device; and other objects as will be manifest from the following description.

Referring to the accompanying drawings.

Figure 1:
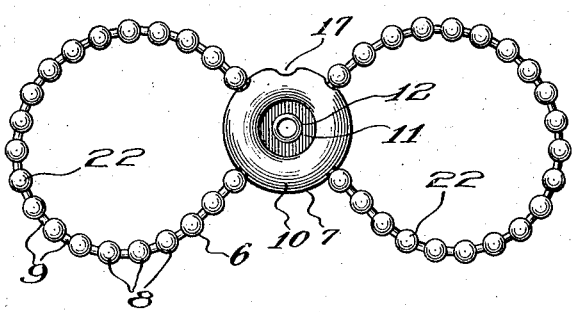
Figure 1 is a face view of a key-holding device embodying my invention.

The device shown comprises a chain element represented at 6 shown as formed of a single length of chain but which may be provided in two lengths if desired; and a coupler 7 associated with the chain element to retain the keys on the latter.

The chain shown, and which is of the form I prefer to use, comprises a series of hollow balls 8 adjacent ones of which are flexibly secured together in spaced relation by connecting links 9, this form of chain being well known in the art.

The coupler 7 is formed of two disk-like sections 10 of the same size and form each having an inset flat portion 11 at which these sections are adapted to fit flatwise together and in which position they are secured as for example by an eyelet represented at 12. Each section 10 presents an inturned peripheral wall portion 13 opposed edges of which substantially meet when the sections 10 are assembled together as stated. The shaping of the sections 10 as stated causes the coupler to present a peripheral annular internal channel 14 substantially circular in cross section and of a diameter preferably exceeding that of the balls 8.

The peripheral wall portions 13 of the sections 10 are recessed as represented at 15 and 16, the recesses 15 opposing each other in the assembled condition of the sections 10 and the recessed portions 16 likewise opposing each other, to form openings in the periphery of the coupler of a size less than the diameter of the balls 8, the peripheral wall portions 13 of the sections 10 being each recessed as represented at 17 between the recesses 15 and 16 and of such a depth as to provide an opening in the periphery of the coupling member of larger size than the diameter of the balls 8.

At the opposite side of the center of the coupler the peripheral wall 13 of each section 10 is recessed as represented at 18 and 19, the recesses 18 opposing each other when the sections 10 are assembled and the recesses 19 likewise opposing each other, the openings formed by the opposed recesses 18 and the opposed recesses 19 being smaller than the diameter of the balls 8.

Figure 2:
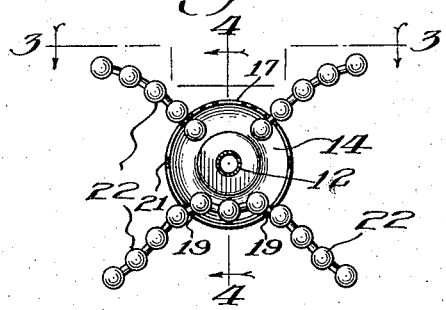
Figure 2 is a similar view of the device of Fig. 1 showing one of the dished sections of the coupler member for the flexible element removed, and portions of said element broken away, this view being taken at the line 2—2 on Fig. 4 and viewed in the direction of the arrow, the parts being shown of reduced size.
Figure 3:
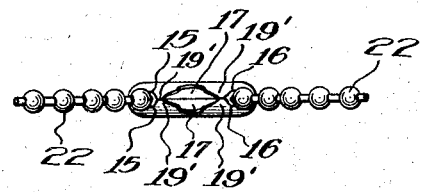
Figure 3 is a plan view of the structure shown in Fig. 2, the device being viewed at the line 3—3 on Fig. 2 and in the direction of the arrows.
Figure 4:
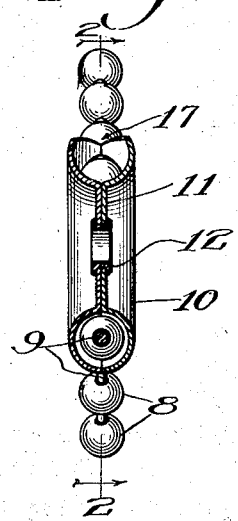
Figure 4 is an enlarged sectional view taken at the line 4—4 on Fig. 2 and viewed in the direction of the arrows.
Figure 5:
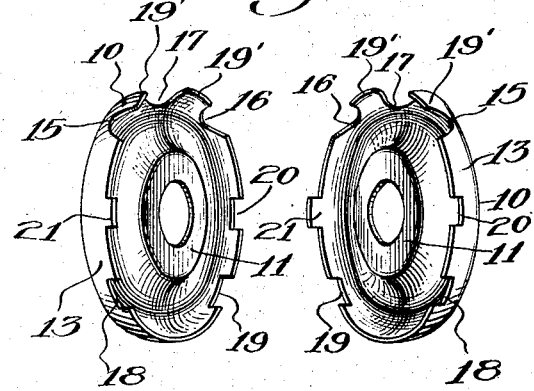
Figure 5, a perspective view of the two similar dished sections forming the coupler, these sections being spaced apart but shown in the relative positions they occupy in the assembling of the same to form the coupler.

In the assembling of the parts of the device as shown in Figs. 1, 2, 3 and 4, the chain 6 is introduced at a portion thereof between its ends into the channel-forming portion of one of the sections 10, with the adjacent connecting links 9 extending within the recesses 18 and 19 therein as shown in Fig. 2. The other section 10, for completing the coupler 7, is then applied to the first-referred-to section to the position shown in Figs. 3 and 4 in which position its recesses 18 and 19 register with the recesses 18 and 19 of the other section 10. The sections 10 are then secured together by applying the rivet 12 thereto.

The ends of the chain element 6 are releasably engaged with the coupler 7. These ends may be assembled with the coupler section 10 of Fig. 2 before applying the other section 10 thereto, by inserting the end balls 8 into the channel-forming recess of the section 10 of Fig. 2 with the adjacent connecting links 9 lying within the recesses 15 and 16; or they may be assembled with the coupler member 7 after assembling the elements of the coupler member with the intermediate portion of the chain. In the latter case the ends of the chain are connected with the coupler by introducing the end balls through the opening formed by the companion recesses 17 (the balls in the particular construction shown being introduced one at a time) and the end connecting links 9 forced between the opposing tongues 19' spreading them apart against the springiness of the metal, these connecting links entering the openings formed by the companion recesses 15 and the companion recesses 16.

The disengagement of either end of the chain element 6 from the coupler 7 is effected by forcing the chain in the opposite direction past the opposing tongues 19' to permit of the withdrawal of the end ball through the large opening formed by the companion recesses 17.

As a means of preventing accidental rotation of the sections 10 relative to each other, each of these sections is provided in its peripheral wall with a recess 20 and a tongue 21, diametrically opposed, the tongues 21 on these members interfitting, respectively, with the registering recesses 20.

The assembling of the chain element 6 with the coupler 7 as stated causes the device to present two separate loops indicated at 22 adapted when the ends of the chain element are released from the coupler to be threaded through the keys to be held by the device, whereby the user may keep certain keys separated from the balance of the keys, these loops 22 in the construction shown being maintained of a fixed size by reason of the connection of the chain element with the coupler in a way to prevent shifting of the intermediate portion of the chain in the coupler. It may be here stated that if desired, as above suggested, the two loops 22 be formed by separate lengths of chain, instead of a single length, the two sections 10 when assembled as explained holding, against detachment therefrom, one end of each of the two lengths as shown of the intermediate portion of the chain in Fig. 2, and the other ends of the lengths of chain being releasably engaged with the coupler 7 as in the case of the two ends of the endless chain shown in Figs. 1 and 2 and as above described.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A key-holding device comprising a flexible element and a hollow coupler formed of separate sections, the ends of said element being located within said coupler and releasably held thereby against disconnection therefrom.

2. A key-holding device comprising a flexible element and a coupler formed of separate sections presenting an internal peripheral channel, the ends of said element extending through the peripheral wall of said channel and into said channel and releasably confined therein.

3. A key-holding device comprising a flexible element and a coupler formed of separate sections presenting an internal peripheral channel, the ends of said element extending through the peripheral wall of said channel and into said channel and releasably confined therein, said element presenting a plurality of loop sections separated by said coupler.

4. A key-holding device comprising a flexible element and a hollow coupler formed of similar disk sections flatwise secured together, the ends of said element extending into said coupler and releasably held thereto, said element extending at an intermediate portion into said coupler, whereby said element presents a plurality of loop portions.

5. A key-holding device comprising a flexible element and a coupler therefor comprising separate sections between which the ends of said element are releasably confined.

6. A key-holding device comprising a flexible element and a coupler therefor comprising separate sections between which the ends of said element are releasably confined, said element presenting a plurality of loop portions separated by said coupler.

7. A key-holding device comprising a flexible element and a coupler therefor comprising separate sections between which the ends of said elements are releasably confined, said element extending at an intermediate portion between said coupler sections and held thereby against lengthwise displacement.

8. A key-holding device comprising a flexible element and a coupler formed of disk-like sections, a connector for said sections located at substantially the center of said sections, said element extending at its ends between said sections and releasably held thereto, and means comprising cooperating shoulder portions on said sections for preventing relative rotation of the latter.

9. A key-holding device comprising, in combination, a pair of similar disk sections formed with thin resilient walls substantially perpendicular to the plane of the disks and said walls formed with a plurality of recesses, certain of said recesses formed with square and others with rounded shoulders, said disks secured together with the edges of said walls in contact and with similar recesses registering, a chain comprising alternate large and small links, one of said small links standing in an opening formed by square shouldered recesses, and a small link adjacent an end of the chain standing in round shouldered openings and removable therefrom by resilience of said walls.

10. A key-holding device comprising, in combination, a pair of similar disk sections formed with thin resilient walls substantially perpendicular to the plane of the disks and said walls formed with a plurality of recesses, certain of said recesses formed with square and others with rounded shoulders, said disks secured together with the edges of said walls in contact and with similar recesses registering, a chain comprising alternate large and small links, two of said small links at an intermediate portion of the chain standing in openings formed by square shouldered recesses with a connecting large link confined between said disks and a small link adjacent each end of the chain standing in each of two openings formed by round shouldered recesses with a large link at each end confined between said disks and removable by resilience of said walls.

JOSEPH KOMOROUS.